US 7,548,762 B2

(12) United States Patent
Fabrega-Sanchez et al.

(10) Patent No.: US 7,548,762 B2
(45) Date of Patent: Jun. 16, 2009

(54) METHOD FOR TUNING A GPS ANTENNA MATCHING NETWORK

(75) Inventors: Jorge Fabrega-Sanchez, San Diego, CA (US); Henry Chang, San Diego, CA (US); Srivatsan Veeraraghavan, San Diego, CA (US); Ammar Kitabi, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 605 days.

(21) Appl. No.: 11/291,458

(22) Filed: Nov. 30, 2005

(65) Prior Publication Data

US 2007/0135160 A1 Jun. 14, 2007

(51) Int. Cl.
*H04M 1/00* (2006.01)

(52) U.S. Cl. ............. 455/556.1; 455/114.2; 455/115.1; 455/119; 455/125

(58) Field of Classification Search ............. 455/556.1, 455/114.2, 115.1, 119, 125, 173.1, 178.1, 455/187.1, 191.1, 226.2, 226.3

See application file for complete search history.

(56) References Cited

U.S. PATENT DOCUMENTS

| 3,239,838 A | 3/1966 | Kelleher |
| 3,413,543 A | 11/1968 | Schubring et al. |
| 3,569,795 A | 3/1971 | Gikow |
| 3,676,803 A | 7/1972 | Simmons |
| 3,678,305 A | 7/1972 | George |
| 3,680,135 A | 7/1972 | Boyer |
| 3,737,814 A | 6/1973 | Pond |
| 3,739,299 A | 6/1973 | Adler |
| 3,836,874 A | 9/1974 | Maeda et al. |
| 3,918,012 A | 11/1975 | Peuzin |
| 4,122,400 A | 10/1978 | Medendorp et al. |
| 4,236,125 A | 11/1980 | Bernard et al. |
| 4,475,108 A | 10/1984 | Moser |
| 4,484,157 A | 11/1984 | Helle et al. |
| 4,494,081 A | 1/1985 | Lea et al. |
| 4,525,720 A | 6/1985 | Corzine et al. |

(Continued)

FOREIGN PATENT DOCUMENTS

DE      40 36 866      7/1991

(Continued)

OTHER PUBLICATIONS

Chandler, S.R. et al., "Active Varactor Tunable Bandpass Filter," IEEE Microwave and Guided Wave Letters, vol. 3, No. 3, Mar. 1993, pp. 70-71.

(Continued)

*Primary Examiner*—Tuan A Pham (57) ABSTRACT

A system and method is provided for tuning a Global Positioning System (GPS) antenna matching circuit in a portable wireless communications device. The method includes accepting a first matching circuit tuning value, measuring satellite vehicle (SV) carrier-to-noise ratio (C/N) associated with the first tuning value and a first search time interval, measuring the SV C/N associated with a next tuning value, and selecting the tuning value associated with the highest SV C/N to tune the matching circuit. In one aspect, the method further includes comparing the SV C/N to a first minimum threshold. If the first tuning value SV C/N exceeds the first minimum threshold, then the method measures the SV C/N associated with the next tuning value. Otherwise, a default tuning value can be selected to tune the matching circuit.

29 Claims, 6 Drawing Sheets

U.S. PATENT DOCUMENTS

| | | |
|---|---|---|
| 4,626,800 A | 12/1986 | Murakami et al. |
| 4,733,328 A | 3/1988 | Blazej |
| 4,736,169 A | 4/1988 | Weaver et al. |
| 4,737,797 A | 4/1988 | Siwiak et al. |
| 4,746,925 A | 5/1988 | Toriyama |
| 4,792,939 A | 12/1988 | Hikita et al. |
| 4,799,066 A | 1/1989 | Deacon |
| 4,835,499 A | 5/1989 | Pickett |
| 4,835,540 A | 5/1989 | Haruyama et al. |
| 4,847,626 A | 7/1989 | Kahler et al. |
| 4,975,604 A | 12/1990 | Barta |
| 5,166,857 A | 11/1992 | Avanic et al. |
| 5,173,709 A | 12/1992 | Lauro et al. |
| 5,212,463 A | 5/1993 | Babbitt et al. |
| 5,216,392 A | 6/1993 | Fraser |
| 5,227,748 A | 7/1993 | Sroka |
| 5,231,407 A | 7/1993 | McGirr et al. |
| 5,293,408 A | 3/1994 | Takahashi et al. |
| 5,307,033 A | 4/1994 | Koscica et al. |
| 5,325,099 A | 6/1994 | Nemit et al. |
| 5,388,021 A | 2/1995 | Stahl |
| 5,406,163 A | 4/1995 | Carson et al. |
| 5,416,803 A | 5/1995 | Janer |
| 5,427,988 A | 6/1995 | Sengupta et al. |
| 5,450,092 A | 9/1995 | Das |
| 5,451,915 A | 9/1995 | Katzin et al. |
| 5,459,123 A | 10/1995 | Das |
| 5,472,935 A | 12/1995 | Yandrofski et al. |
| 5,479,139 A | 12/1995 | Koscica et al. |
| 5,495,215 A | 2/1996 | Newell et al. |
| 5,496,795 A | 3/1996 | Das |
| 5,496,796 A | 3/1996 | Das |
| 5,502,422 A | 3/1996 | Newell et al. |
| 5,525,942 A | 6/1996 | Horii et al. |
| 5,557,286 A | 9/1996 | Varadan et al. |
| 5,561,307 A | 10/1996 | Mihara et al. |
| 5,561,407 A | 10/1996 | Koscica et al. |
| 5,564,086 A | 10/1996 | Cygan et al. |
| 5,574,410 A | 11/1996 | Collins et al. |
| 5,577,025 A | 11/1996 | Skinner et al. |
| 5,583,524 A | 12/1996 | Milroy |
| 5,589,845 A | 12/1996 | Yandrofski |
| 5,600,279 A | 2/1997 | Mori |
| 5,617,104 A | 4/1997 | Das |
| 5,640,042 A | 6/1997 | Koscica et al. |
| 5,649,306 A | 7/1997 | Vanatta et al. |
| 5,652,599 A | 7/1997 | Wallace et al. |
| 5,673,188 A | 9/1997 | Lusher et al. |
| 5,701,595 A | 12/1997 | Green, Jr. |
| 5,721,194 A | 2/1998 | Yandrofski et al. |
| 5,729,239 A | 3/1998 | Rao |
| 5,777,524 A | 7/1998 | Wojewoda et al. |
| 5,777,839 A | 7/1998 | Sameshina et al. |
| 5,778,308 A | 7/1998 | Sroka et al. |
| 5,830,591 A | 11/1998 | Sengupta et al. |
| 5,834,975 A | 11/1998 | Bartlett et al. |
| 5,864,932 A | 2/1999 | Evans et al. |
| 5,870,670 A | 2/1999 | Ripley |
| 5,880,921 A | 3/1999 | Tham et al. |
| 5,892,486 A | 4/1999 | Cook et al. |
| 5,908,811 A | 6/1999 | Das |
| 5,945,887 A | 8/1999 | Makino et al. |
| 5,965,494 A | 10/1999 | Terashima et al. |
| 5,973,567 A | 10/1999 | Heal et al. |
| 5,973,568 A | 10/1999 | Shapiro et al. |
| 5,986,515 A | 11/1999 | Sakurai |
| 5,987,314 A | 11/1999 | Salto |
| 5,990,766 A | 11/1999 | Zhan |
| 6,008,659 A | 12/1999 | Traynor |
| 6,018,282 A | 1/2000 | Tsuda |
| 6,020,787 A | 2/2000 | Kim et al. |
| 6,026,311 A | 2/2000 | Willemsen Cortes et al. |
| 6,028,561 A | 2/2000 | Takei |
| 6,049,726 A | 4/2000 | Gruenwald et al. |
| 6,052,036 A | 4/2000 | Enstrom et al. |
| 6,054,908 A | 4/2000 | Jackson |
| 6,094,588 A | 7/2000 | Adam |
| 6,097,263 A | 8/2000 | Mueller et al. |
| 6,101,102 A | 8/2000 | Brand et al. |
| 6,108,191 A | 8/2000 | Bruchhaus et al. |
| 6,160,524 A | 12/2000 | Wilber |
| 6,181,777 B1 | 1/2001 | Kiko |
| 6,198,441 B1 | 3/2001 | Okabe |
| 6,216,020 B1 | 4/2001 | Findikoglu |
| 6,242,843 B1 | 6/2001 | Pohjonen et al. |
| 6,272,336 B1 | 8/2001 | Appel et al. |
| 6,278,383 B1 | 8/2001 | Endo et al. |
| 6,281,023 B2 | 8/2001 | Eastep et al. |
| 6,281,534 B1 | 8/2001 | Arita et al. |
| 6,285,337 B1 | 9/2001 | West et al. |
| 6,292,143 B1 | 9/2001 | Romanofsky |
| 6,294,964 B1 | 9/2001 | Satoh |
| 6,308,051 B1 | 10/2001 | Atokawa |
| 6,327,463 B1 | 12/2001 | Welland |
| 6,329,959 B1 | 12/2001 | Varadan et al. |
| 6,333,719 B1 | 12/2001 | Varadan |
| 6,335,710 B1 | 1/2002 | Falk et al. |
| 6,344,823 B1 | 2/2002 | Deng |
| 6,359,444 B1 | 3/2002 | Grimes |
| 6,362,784 B1 | 3/2002 | Kane et al. |
| 6,362,789 B1 | 3/2002 | Trumbull et al. |
| 6,384,785 B1 | 5/2002 | Kamogawa et al. |
| 6,404,304 B1 | 6/2002 | Kwon et al. |
| 6,456,236 B1 | 9/2002 | Hauck et al. |
| 6,462,628 B2 | 10/2002 | Kondo et al. |
| 6,489,860 B1 | 12/2002 | Ohashi |
| 6,503,786 B2 | 1/2003 | Klodzinski |
| 6,518,850 B1 | 2/2003 | Falk et al. |
| 6,518,920 B2 | 2/2003 | Proctor, Jr. et al. |
| 6,522,220 B2 | 2/2003 | Yamada et al. |
| 6,525,630 B1 | 2/2003 | Zhu et al. |
| 6,525,691 B2 | 2/2003 | Varadan et al. |
| 6,531,936 B1 | 3/2003 | Chiu et al. |
| 6,559,737 B1 | 5/2003 | Nagra et al. |
| 6,571,110 B1 | 5/2003 | Patton et al. |
| 6,600,456 B2 | 7/2003 | Gothard et al. |
| 6,653,977 B1 | 11/2003 | Okabe et al. |
| 6,667,723 B2 | 12/2003 | Forrester |
| 6,686,817 B2 | 2/2004 | Zhu et al. |
| 6,721,293 B1 | 4/2004 | Komulainen et al. |
| 6,727,535 B1 | 4/2004 | Sengupta et al. |
| 2001/0026243 A1 | 10/2001 | Koitsalu et al. |
| 2001/0043159 A1 | 11/2001 | Masuda et al. |
| 2002/0049064 A1 | 4/2002 | Banno |
| 2002/0149526 A1 | 10/2002 | Tran et al. |
| 2002/0149535 A1 | 10/2002 | Toncich |
| 2002/0175878 A1 | 11/2002 | Toncich |
| 2003/0062971 A1 | 4/2003 | Toncich |
| 2003/0134665 A1 | 7/2003 | Kato et al. |
| 2004/0196121 A1 | 10/2004 | Toncich |
| 2004/0263411 A1 | 12/2004 | Fabrega-Sanchez et al. |
| 2005/0007291 A1 | 1/2005 | Fabrega-Sanchez et al. |
| 2005/0090207 A1* | 4/2005 | Oiwa .......................... 455/101 |
| 2006/0063537 A1* | 3/2006 | Lee et al. ................. 455/456.1 |

FOREIGN PATENT DOCUMENTS

| | | |
|---|---|---|
| DE | 100 24 483 | 11/2001 |
| DE | 101 37 753 | 2/2003 |
| EP | 0 125 586 | 11/1984 |
| EP | 0 346 089 | 12/1989 |
| EP | 0 473 373 | 3/1992 |
| EP | 0 531 125 | 3/1993 |
| EP | 0631399 A1 | 12/1994 |

| | | |
|---|---|---|
| EP | 0 637 131 | 2/1995 |
| EP | 0 680 108 | 11/1995 |
| EP | 0 795 922 | 9/1997 |
| EP | 0 854 567 | 7/1998 |
| EP | 0 872 953 | 10/1998 |
| EP | 0 881 700 | 12/1998 |
| EP | 0 892 459 | 1/1999 |
| EP | 0 909 024 | 4/1999 |
| EP | 1 043 741 | 10/2000 |
| EP | 1 058 333 | 12/2000 |
| EP | 0631399 B1 | 3/2002 |
| EP | 1 248 317 | 10/2002 |
| GB | 2 240 227 | 7/1991 |
| JP | 63 128618 | 6/1988 |
| JP | 05182857 | 7/1993 |
| JP | 2001 338839 | 12/2001 |
| WO | WO 82/03510 | 10/1982 |
| WO | WO 94/27376 | 11/1994 |
| WO | WO 00/35042 | 6/2000 |
| WO | WO 00/54418 | 9/2000 |
| WO | WO 00/62367 | 10/2000 |
| WO | WO 02/084798 | 10/2002 |
| WO | WO 03/058759 | 7/2003 |

OTHER PUBLICATIONS

Chang, C. et al., "Microwave Active Filters Based on Coupled Negative Resistance Method," IEEE Trans. on Microwave Theory & Techs., vol. 38, No. 12, Dec. 1990, pp. 1879-1884.

Cohn, S.B., "Dissipation Loss in Multiple-Coupled-Resonator Filters," Proc. IRE 47, Aug. 1959, pp. 1342-1348.

Cuthbert, T., "Broadband Impedance Matching -Fast and Simple", RF Design, Cardiff Publishing Co., vol. 17, No. 12, Nov. 1994, pp. 38, 42, 44, 48, XP000477834.

Dishal, M., "Alignment and Adjustment of Synchronously Tuned Multiple Resonator-Circuit Filters," Proc. IRE 39, Nov. 1951, pp. 1448-1455.

Erker et al., "Monolithic Ka-Band Phase Shifter Using Voltage Tunable BaSrTiO3 Parallel Plate Capacitors", IEEE Microwave and Guided Wave Letters, IEEE Inc., vol. 10, No. 1, Jan. 2000, pp. 10-12 XP-000930368.

Fubini, E.G. et al., "Minimum Insertion Loss Filters," Proc. IRE 47, Jan. 1959, pp. 37-41.

Fujita, K. et al., "A 15.6 GHz Commercially Based 1/8 GaAs Dynnamic Presealer," 1989 IEEE GaAs IC Symposium, pp. 113-116.

Galt, D. et al., "Ferroelectric Thin Film Characterization Using Superconducting Microstrip Resonators", IEEE Trans on Appl Superconductivity Jun. 1995 IEEE, pp. 2575-2578, vol. 5, No. 2, Piscataway, NJ, USA.

Getsinger, W.J., "Prototypes for Use in Broadbanding Reflection Amplifiers," IEEE Trans. PTGMTT-11, Nov. 1963, pp. 486-497.

Getsinger, W.J. et al., "Some Aspects of the Design of Wide-Band Up-Converters and Nondegenerate Parametric Amplifiers," IEEE Trans. PTGMTT-12, Jan. 1964, pp. 77-87.

Gevorgian, Spartak S. et al., "HTS/Ferroelectric Devices for Microwave Applications", IEEE Transactions on Applied Superconductivity, Jun. 1997, pp. 2458-2461, IEEE, USA.

Hopf, B. et al., "Coplanar MMIC Active Bandpass Filters Using Negative Resistance Circuits," 1994 IEEE MTT-S Symposium Digest, pp. 1183-1185.

Hunter, I.C. et al., "Electronically Tunable Microwave Bandpass Filters," IEEE Trans. on MTT, vol. 30, No. 9, Sep. 1982, pp. 1354-1367.

Jose et al., "Experimental investigations on electronically tunable microstrip antennas," Feb. 5, 1999, Microwave and optical technology letters, vol. 20, No. 3, pp. 166-169.

Kapilevich, B., "Understand the Operation of Channelized Active Filters," Microwaves & RF, Jan. 1997, pp. 89-92.

Kapilevich, B., "Variety of Approaches to Designing Microwave Active Filters," Proc. 27th European Microwave Conference, Jerusalem, vol. 1, 1997, pp. 397-408.

Karacaoglu, U. et al., "High Selectivity Varactor-Tuned MMIC Bandpass Filter Using Lossless Active Resonators," 1994 IEEE MTT-Symposium Digest, pp. 1191-1194.

Katzin, P. et al., "Narrow-band MMIC Filters with Automatic Tuning and Q-Factor Control," 1993 IEEE MTT-S Int. Microwave Symposium Digest, pp. 403-406.

Keis, V. N. et al., "20GHz tunable filter based on ferroelectric (BaSr)TiO3 film varactors", Electronics Letters, May 28, 1998, vol. 34, No. 11, IEE Stevenage, GB.

Kotzebue, K.L., "Broadband Electronically-Tunable Microwave Filters," 1960 IRE Wescon Convention Record, Part 1, pp. 21-27.

Kozyrev, A., et al., "Ferroelectric Films: Nonlinear Properties and Applications in Microwave Devices", 1998 IEEE MTT-S Digest, May 1998, pp. 985-988, 1998 IEEE MTT-S Intl Baltimore, MD, USA, IEEE, USA.

Krautkramer, V.W. et al., "Resonanztransformatoren mit drei Reaktanzen als transformierende Filter", Bulletin des Schweizerischen Elektrotechnischen Vereins, Zurich, CH, vol. 64, No. 23, Nov. 10, 1973, pp. 1500-1509, XP002184530.

Kuh, E.S. et al., "Optimum Synthesis of Wide-Band Parametric Amplifiers and Converters," IRE Trans. PCCT-8, Dec. 1961, pp. 410-415.

Louhos, J.P. et al., "Electrical Tuning of Integrated Mobile Phone Antennas," Nokia Mobile Phones, pp. 69-97 (Sep. 15, 1999).

Makioka, S. et al., "A High Efficiency GaAs MCM Power Amplifier for 1.9 GHz Digital Cordless Telephones," IEEE 1994 Microwave & Millimeter-Wave Monolithic Cir. Sym., pp. 51-54.

Matthaei, G.L., "An Electronically Tunable Up-Converter," Proc. IRE 49, Nov. 1961, pp. 1703-1704.

Nauta, B., "A CMOS Transconductance-C Filter Technique for Very High Frequencies," IEEE Journal of Solid-State Circuits, vol. 27, No. 2, Feb. 1992, pp. 142-153.

Panayi, P.K. et al., "Tuning Techniques for the Planar Inverted-F Antenna," National Conference on Antennas and Propagation Publication, No. 461, pp. 259-262, (Apr. 1999).

Presser, A., "Varactor-Tunable, High-Q Microwave Filter," RCA Review, vol. 42, Dec. 1981, pp. 691-705.

Sleven, R.L., "Design of a Tunable Multi-Cavity Waveguide Band-Pass Filter," 1959 IRE National Convention Record, Part 3, pp. 91-112.

Smuk, J. et al., "MMIC Phase Locked L-S Band Oscillators," 1994 IEEE GaAs Symposium Digest, pp. 27-29.

Taub, J.J. et al., "Design of Three-Resonator Dissipative Band-Pass Filters Having Minimum Insertion Loss," Proc. IRE 45, pp. 681-687 (May 1957).

Toncich et al., "Data Reduction Method for Q Measurements of Stripline Resonators", IEEE Transactions in MTT, vol. 40, No. 9, Sep. 1992, pp. 1833-1836.

Toyoda, S., "Quarter-wavelength Coupled Variable Bandstop and Bandpass Filters Using Varactor Diodes," IEEE Trans. on MTT, vol. 30, No. 9, Sep. 1982, pp. 1387-1389.

Varadan, V.K. et al., "Design and Development of Electronically Tunable Microstrip Antennas," IOP Publishing Ltd., pp. 238-242, (1999).

Vendik, O.G. et al., "1GHz tunable resonator on bulk single crystal SrTiO3 plated with Yba2Cu307-x films", Electronics Letters, Apr. 13, 1995, pp. 654-656, vol. 31, No. 8, IEE Stevenage, GB.

* cited by examiner

METHOD FOR TUNING A GPS ANTENNA MATCHING NETWORK

FIELD OF THE INVENTION

This invention generally relates to wireless communications and, more particularly, to a system and method for tuning a Global Positioning System (GPS) antenna matching circuit.

BACKGROUND OF THE INVENTION

Many handheld communication devices now have the capability of receiving and processing GPS signals. The GPS antennas of these devices are usually embedded internally, and separated from the other communication systems. Those antennas are narrowband in nature, since they only have to cover a very narrow portion (about 10 Megahertz (MHz) of the spectrum around 1575 MHz, while minimizing interaction with any other communication system antennas within the same device. Due to the narrow bandwidth of these antennas, they are particularly sensitive to changes in the proximate environment, such as loading associated with a user's hand. Small changes in the proximate environment can produce a significant detuning of the antenna and, consequently, greatly deteriorate its performance (efficiency). Many times, these changes in proximate environment are unpredictable and user dependent.

Typically, in the free space environment the GPS internal antenna is designed to have peak efficiency around 1575 MHz (the GPS transmit frequency). However, when a user holds a handset while operating in the GPS mode, the GPS internal antenna becomes detuned. As a result, the GPS performance in actual usage is much poorer than measurements in free space due to the losses that result from human hand absorption and reflection due to impedance mismatch.

Conventionally, the GPS antenna in a handheld device has no matching network, or if present, its tuning is fixed for a particular topology and proximate environment. With an increased demand for an improvement in indoor sensitivity, and support for emergency calls and LBS (Location Based Services), a need for improved GPS antenna performance is desirable. A tunable matching circuit that could correct for the detuning effect of the proximate environment upon the antenna, would enhance the performance of the antenna and of the overall GPS link for any given environment scenario.

SUMMARY OF THE INVENTION

Changes in the return loss (matching) of an efficient GPS antenna, due to hand loading or other detuning effects, can translate into a very significant degradation of antenna efficiency. Although losses in the antenna's efficiency due to user hand-absorption are not correctable, the detuning of the GPS internal antenna can be restored if the antenna's matching network can be dynamically adjusted to match the impedance of the antenna with the user's hand over the handset. Preliminary measurements have indicated that approximately a 1.5 dB improvement in the ratio of unmodulated signal power (C) to the power spectral density of the background noise (N), carrier-to-noise ratio (C/N) can be restored by properly adjusting the antenna's matching network.

The use of a tunable matching network corrects for the detuning, or changes in the proximate environment, to improve the overall antenna efficiency. Tuning the matching network has the effect of "correcting" the impedance mismatch with the GPS antenna and, hence, lowering the return loss at 1575 MHz. Tuning the matching network also has an effect of tuning the frequency of the matching network. The invention described herein provides a suitable control algorithm, for use with a tunable matching circuit, for maximizing the efficiency of a GPS antenna. This algorithm provides feedback to the matching circuit, based on GPS system parameters, such as number of received satellites, C/N, or the like. Different algorithms may be used depending on search time available.

In another aspect, the wireless device may operate in a hybrid mode, using satellite vehicle (SV) and base station pilots, in which case a reduced number of SVs may be required. Another strategy is to perform searches in both directions (higher and lower) from a default tuning value, measuring the C/N, and picking a direction based upon the highest measured C/N. Then, tuning and measuring C/N can be continued in the same direction. If the difference in the C/N value improvement between one iteration and the next becomes smaller, or falls below a certain threshold, the tuning can be stopped.

The invention can be used with a cellular telephone handset, PDA, or other handheld mobile device that has GPS capabilities. The invention is particularly useful when an internal antenna is used solely to receive GPS signals, as the antenna is separate and independent of other communication system antennas in the same device.

Accordingly, a method is provided for tuning a Global Positioning System (GPS) antenna matching circuit in a portable wireless communications device. The method comprises providing a GPS antenna with a selectively tunable matching circuit, accepting a first matching circuit tuning value, measuring SV C/N associated with the first tuning value and a first search time interval, measuring the SV C/N associated with a next tuning value and the first search time interval, and selecting the tuning value associated with the highest SV C/N to tune the matching circuit.

In one aspect, the method further comprises: comparing the SV C/N to a first minimum threshold. If the first tuning value SV C/N exceeds the first minimum threshold, then the method measures the SV C/N associated with the next tuning value. If the first tuning value SV C/N fails to meet the first minimum threshold, a default tuning value can be selected to tune the matching circuit.

Alternatively, if the SV C/N does not exceed the first minimum threshold, SV C/N can be measured using the first tuning value and a second search time interval, longer than the first time interval. In this aspect, the SV C/N can then be compared to a second minimum threshold. In response to the SV C/N exceeding the second minimum threshold, a next tuning value can be used to measure the SV C/N at the second search time interval. Then, the tuning value associated with the highest SV C/N, measured at the second search time interval, is used to tune the matching circuit. In one aspect, if the SV C/N measured at the second search time interval, does not exceed the second minimum threshold, then SV C/N is measured at a third search time interval, longer than the second search time interval.

Additional details of the above-described method, and a system for tuning a GPS antenna matching circuit in a portable wireless device, are provided below.

DETAILED DESCRIPTION

Figure 1:
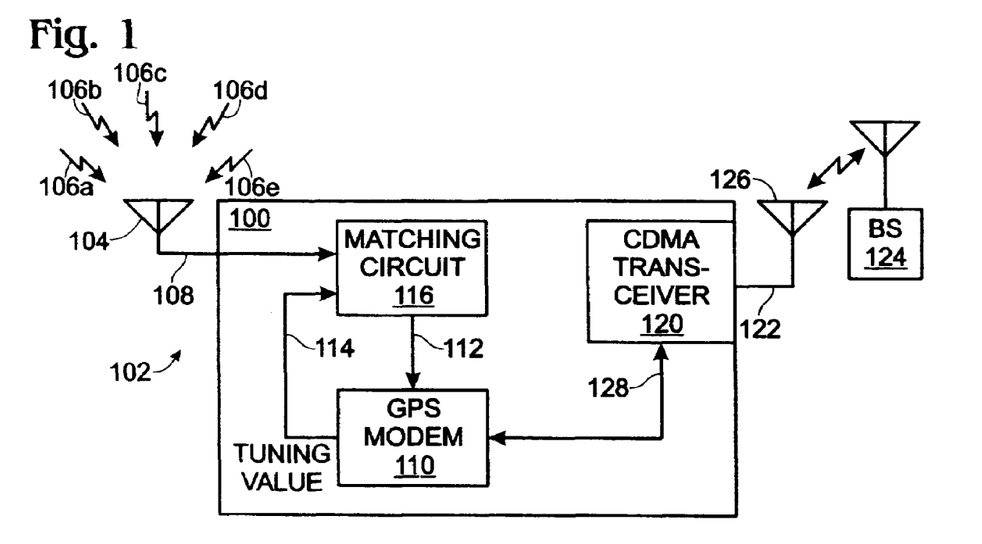
FIG. 1 is a schematic block diagram of a system for tuning a Global Positioning System (GPS) antenna matching circuit portable wireless communications device according to one embodiment of the invention.

FIG. 1 is a schematic block diagram of an exemplary system for tuning a Global Positioning System (GPS) antenna matching circuit portable wireless communications device 100 according to one embodiment of the invention. The system 102 comprises an antenna 104 for receiving Satellite Vehicle (SV) signals radiated through an air or space medium, represented by reference designators 106a through 106e. The number of visible SVs (SVs whose signals can be received) is dependent upon geographic features near the wireless device 100, device altitude, and weather conditions. Generally however, an absolute minimum of three SVs are required to determine a stationary position. Four SVs are minimally required to determine the position of a moving device 100. Often, a wireless device 100 is able to receive signals from eight SVs simultaneously in an outdoor environment. The antenna 104 has an interface 108 (i.e., a hardwire such as a coaxial line connector) for supplying conducted SV signals.

A GPS modem 110 has an input on line 112 to accept the SV signals. The GPS modem measures a quality criteria, such as SV carrier-to-noise ratio (C/N), and supplies a tuning value signal at an output on line 114. Generally, C/N measurements are used herein as the criteria of quality. However, other measurements of quality are also possible, such as the number of SVs that can be "seen", Rx power of the SV, Doppler, horizontal position error, RMS error, position acquisition time, position deviation, peak to normalized energy, distance between the two segments offsets, or an optimal group of SVs, to name a few.

A tunable matching circuit 116 has a first input connected to the antenna interface on line 108, a second input on line 114 to receive the tuning value signal, and an output on line 112 that is connected to the GPS modem input. The matching circuit 116 selectively tunes the impedance of its input to the antenna interface on line 108 in response to the tuning value signal on line 114. By way of example, if the matching circuit 116 uses ferroelectric (FE) capacitors, then the tuning value signal on line 114 may be a dc voltage that is used to generate a desired FE capacitance value. If the matching circuit 116 uses multiple FE capacitors, then the tuning value signal on line 114 may be multiple dc voltages, one for every FE capacitor. However, the system 100 is not limited to any particular type of matching circuit, but rather, will operate in conjunction with any tunable matching circuit, regardless of how the tunability is achieved.

The GPS modem 110 supplies a first tuning value, and measures the SV C/N associated with the first tuning value and a first search time interval. As is understood by those skilled in the art, the processing gain associated with acquiring a SV spread spectrum signal is related to the speed at which a bandpass is integrated. While a rapid integration time is desirable for the quick acquisition of relatively strong signals, a slow time interval (higher gain) is desired for relatively weak SV signals.

For example, the first tuning value may be an initial value, or a default value, chosen as a result of the previous measurement routine perhaps. In a simple aspect, the GPS modem 110 supplies a next tuning value on line 114, measures the SV C/N associated with the next tuning value and the first search time interval. Then, the GPS modem 110 selects the tuning value associated with the highest SV C/N to tune the matching circuit 116. In this example two tuning values (the "first" and "next") have been used. However, the system 100 is not limited to any particular number of tuning values.

In a slightly more complex aspect, the GPS modem 110 only supplies the next tuning value in response to the SV C/N associated with the first tuning value exceeding a first minimum threshold. For example, the GPS modem 110 may compare a SV with the highest measured C/N, designated as a first SV, to the first minimum threshold. Then, the GPS modem 110 measures the first SV C/N using the next tuning value and the first search time interval. The tuning value associated with the highest measured first SV C/N, is used to tune the matching circuit 116. This is only one of many different algorithms that may be used to measure the "quality" associated with a particular tuning value according to the present disclosure. It should be understood that a "first" or "second" may also be read to represent a group of SVs.

If the first minimum threshold is not met, the GPS modem 100 may choose to use a default value to tune the matching circuit 116. The default can be a mid-range value, or a value that was determined in a previous measurement process. Alternatively, the system 100 may use two different search intervals. For example, the GPS modem 110 measures the first SV C/N using the first tuning value and a second search time interval, longer than the first time interval, if the first SV C/N does not exceed the first minimum threshold. In one aspect, the measurement of the first SV C/N at the second search time interval, is compared to a second minimum threshold, lower than the first minimum threshold.

If the first SV C/N exceeds the second minimum threshold, the next tuning value is supplied to the matching circuit 116, and the GPS modem 110 measures the first SV C/N at the second search time interval, using the next tuning value. Again, the GPS modem 110 selects the tuning value associated with the highest first SV C/N, measured at the second search time interval, to tune the matching circuit 116.

In a different aspect, the system uses three different search intervals. For example, if the first SV C/N, measured at the second search time interval and the first tuning value, does not exceed the second minimum threshold, then the GPS modem 110 may measure the first SV C/N at a third search time interval, longer than the second search time interval.

In one aspect, the wireless device includes a Code Division Multiple Access (CDMA) cellular transceiver 120 having a wireless interface on line 122 to send a Request GPS Sensitivity Assistance message to a communicating base station (BS) 124. As shown, the cellular transceiver interface 122 includes an antenna 126, distinct from the GPS antenna 104. However, in other aspects (not shown) the GPS modem 110 and cellular transceiver 120 may share an antenna that is tunable between cellular and GPS communication bands. In another aspect not shown, the GPS modem 110 and cellular transceiver 120 may share a dual communication band antenna. The cellular transceiver 120 has an interface on line 128 to receive a Request GPS Sensitivity Assistance message or a Request GPS Assistance Acquisition message from the modem 110. These request messages are sent to BS 124. In return, the CDMA receiver 120 receives the corresponding Provide GPS Sensitivity Assistance message or the Provide GPS Assistance Acquisition message, which can be sent to GPS modem 110 through line 128. In some aspects, the SA message is received prior to measuring the first SV C/N at the third search time interval.

In a different aspect, the CDMA cellular transceiver 120 uses the wireless interface 122 to send a Request GPS Assistance Acquisition message to the communicating BS 124 and supplies a received Provide GPS SA message, with a list of available SVs, on line 128. Not shown is a Position Determination Entity (PDE) associated with the BS 124, which typically handles all the location functionality (e.g. processing the Request and Provide SA and M messages) for a plurality of BSs. From the perspective of the BS 124, the list of available SVs remains constant for long periods of time. The GPS modem receives the list of available SVs from the cellular transceiver prior to measuring SV C/N using the first tuning value and the first search time interval.

Although FIG. 1 shows a CDMA cellular transceiver 120, the system 100 may also be implemented with Global System for Mobile Communications (GSM) or Universal Mobile Telecommunications System (UMTS) cellular transceivers for use in these respective types of cellular networks. It should also be understood that the system has use in other wireless devices besides cellular transponders, such as personal digital assistants (PDAs), notebook computers, and Wireless Local Area Network (WLAN) devices operating in accordance with Bluetooth, IEEE 802.11 and IEEE 802.15 standards.

Functional Description

Figure 2:
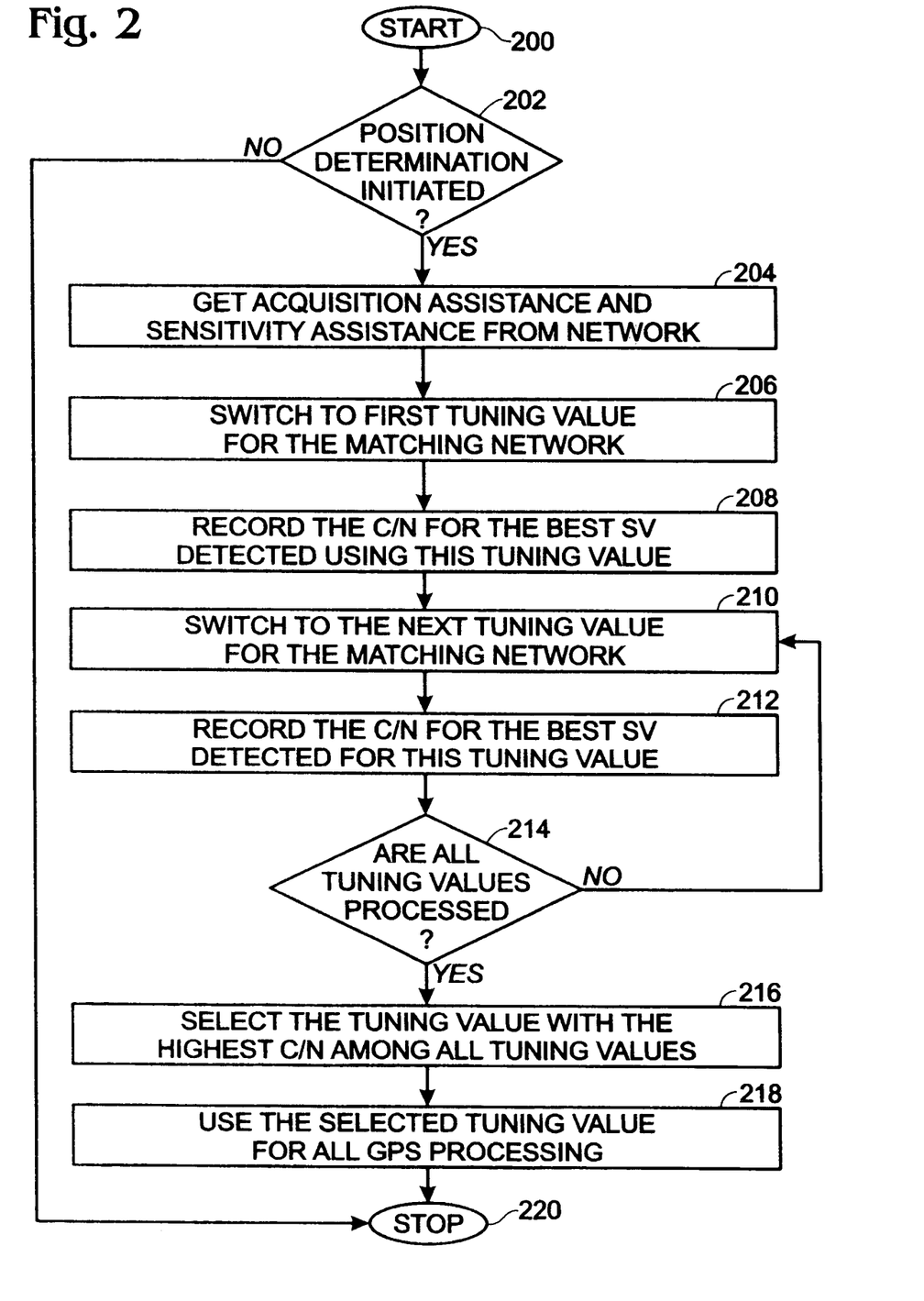
FIG. 2 is a flowchart illustrating an exemplary method for selecting the optimum tuning values for GPS processing according to one embodiment of the invention.

FIG. 2 is a flowchart illustrating an exemplary method for selecting the optimum tuning values for GPS processing. If a position determination is required, the method proceeds to Step 204 where Acquisition Assistance and Sensitivity Assistance information may be requested. In some aspects, this step is skipped. In Step 206 an initial tuning value is selected, and in Step 208 the C/N of the "best" SV is recorded. Alternatively, the C/N of several SVs may be recorded (i.e., the "best" three C/Ns). In Step 210 the next tuning value is selected and in Step 212 the C/N of the best SV is recorded. This process is iterated (Step 214) until all the tuning values have been processed. In Step 216 the tuning value associated with the highest C/N is selected. If groups of C/Ns have been recorded, this step may select the tuning value associated with the highest average C/N. In Step 218 the selected tuning value is used to tune the matching circuit input impedance. The above-described method may be advantageous in scenarios where the GPS and cellular subsystem transceiver are operated simultaneously.

One practical application of above-described GPS antenna matching circuit is in a CDMA wireless device making a 911 call. Since position is an important data item in a 911 call, the cellular network may initiate a position determination session. The network may first probe to determine the capability of the wireless device. All protocol messages used to make this determination are sent over CDMA channels. In this example, the handset may support both GPS and Advanced Forward Link Trilateration (AFLT), which uses base station pilot signal as opposed to GPS. The network Position Determination Entity (PDE), which is responsible for all position determination protocols and calculation of the wireless device's location, sends a Provide GPS Acquisition Assistance Message with a list of available SVs. The wireless device tunes out of the CDMA communications, initially for 200 milliseconds (ms) to look for pseudorange information from the specified SVs. At this point it is desirable to determine the optimal tuning of the matching network by choosing one of the nominal frequency bins, where each bin is associated with a tuning value.

Figure 3A:
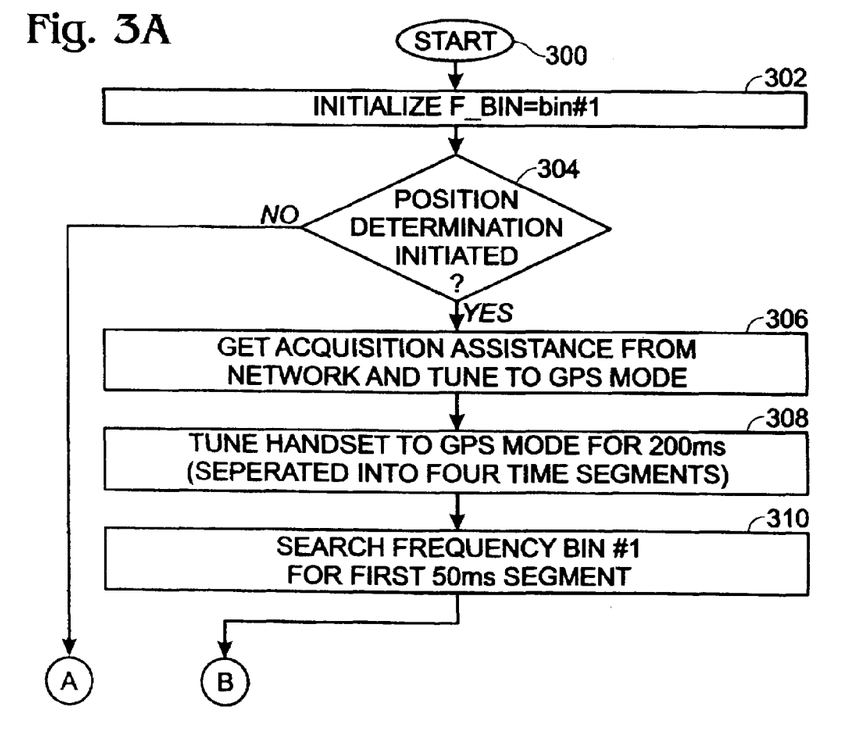
FIGS. 3A and 3B depict a flowcharts illustrating a tuning value search using four search frequency bins according to one embodiment of the invention.
Figure 3B:
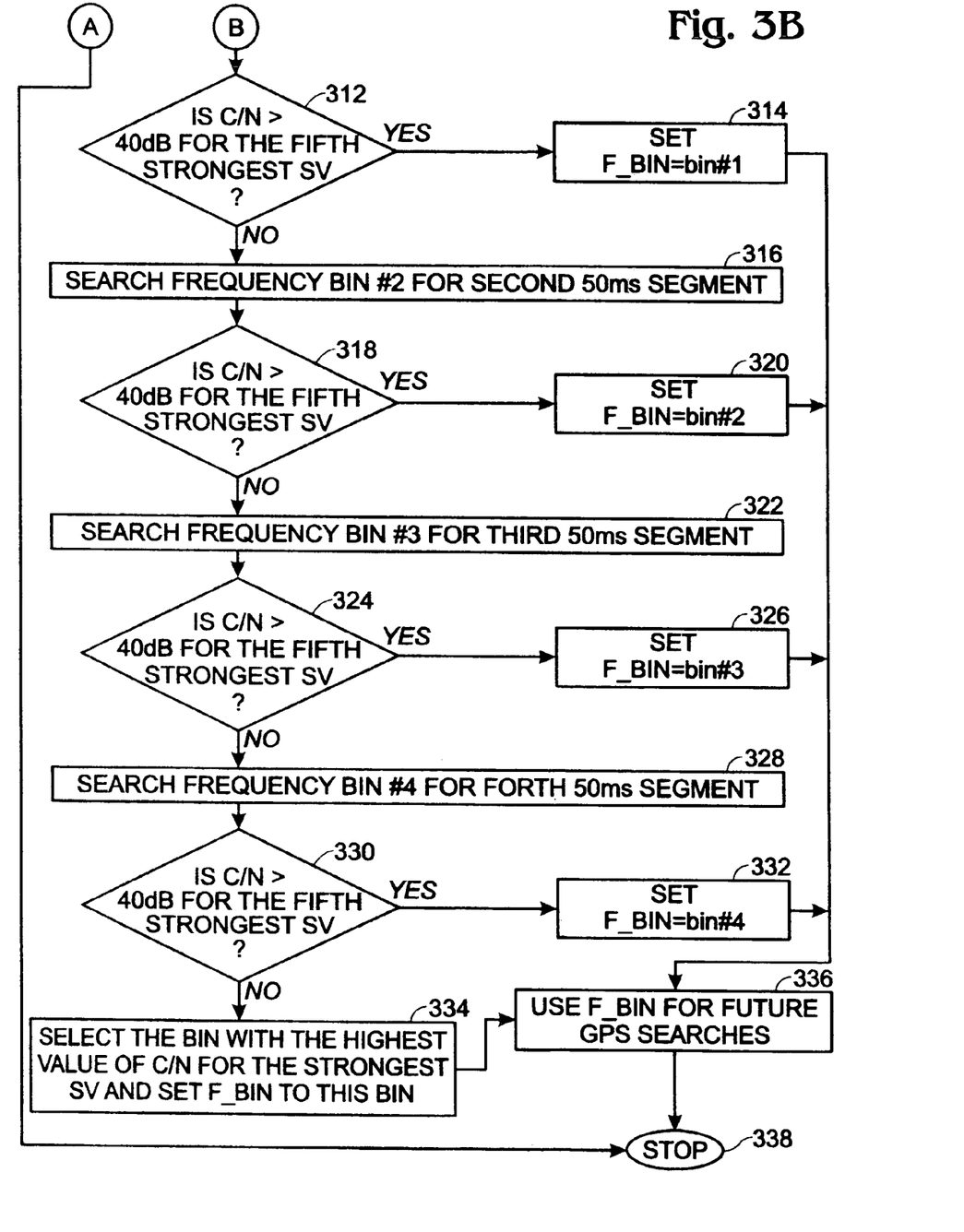

FIGS. 3A and 3B depict a flowchart illustrating a tuning value search using four search frequency bins according to one embodiment. As depicted in the diagram, a 200 ms GPS search is divided into four 50 ms search interval (one for each possible frequency bin). Typically, all the SVs (less than 8) are searched simultaneously during these four 50 ms intervals. The output of the search algorithm determines the optimal frequency bin for the matching network. This frequency bin is used for subsequent GPS searches, including the slow search intervals (not shown in this figure), which conventionally take as long as 1.76 seconds. In another aspect, the total search time to perform the search for the 4 search frequency bins may be larger to allow for searches of SVs with low C/N. In some aspects, the method of FIGS. 3A and 3B may be a sub-routine of a method that uses both High Mode and Low Mode searches, such as the process described by FIG. 4 below, for example.

It should be noted that the GPS antenna matching circuit tuning may depend upon how a user handles the wireless device, and the optimal tuning for a wireless device may vary for different users. In some aspects, the method depicted in FIGS. 3A and 3B may initialize with a previously optimized value of frequency bin, instead of beginning at bin number 1. As shown, Step 302 selects a first matching circuit tuning value (bin #1).

A position determination session (Step 304) is typically initiated in a CDMA network when the base station/PDE sends the Request Mobile Station Information message to the wireless device (in this example the wireless device is a cellular user terminal or mobile station) to determine the mobile station's capabilities in supporting position determination. After the mobile station responds with the Provide Mobile Station Information message, the base station/PDE sends Request Pseudorange Measurement message to the mobile station. The mobile station typically needs to respond to this request within 16 seconds (the current PDE implementation). The mobile station sends a Request GPS Acquisition Assistance (M) message to the base station/PDE. In Step 306, the base station/PDE sends back a list of SVs in the Provide GPS Assistance Acquisition (AA) message, which also includes the code phase search window size for each SV listed.

Once the GPS acquisition information is obtained, the mobile station tunes to the GPS frequency band and begins a search (Step 308), dividing the search time interval into a plurality of time segments. As shown, a 200 ms time interval is divided into 4 segments. However, the method is not necessarily limited to a particular search time interval or a number of segments per interval. Typically however, the number of segments equals the number of tuning values.

In Step 310 SV C/N is measured for the first tuning value. If the SV C/N exceeds a minimum threshold (Step 312), Step 314 selects the first tuning value to tune the matching circuit. In one aspect, a plurality of SV C/N ratios must exceed the minimum threshold. As shown, a minimum of 5 SVs must exceed a minimum threshold of 40 dB. If the SV C/N does not exceed the minimum threshold, the method moves to Step 316, where the second tuning value is selected (bin #2). If the minimum threshold is exceeded in Step 318, the second tuning value used to tune the matching circuit (Step 320).

If the SV C/N does not exceed the minimum threshold in Step 318, the method moves to Step 322, where the third tuning value is selected (bin #3). If the minimum threshold is exceeded in Step 324, the third tuning value used to tune the matching circuit (Step 326). If the SV C/N does not exceed the minimum threshold in Step 324, the method moves to Step 328, where the fourth tuning value is selected (bin #4). If the minimum threshold is exceeded in Step 330, the fourth tuning value used to tune the matching circuit (Step 332). If none of the tuning values yield a SV C/N that exceeds the minimum threshold, Step 334 selects the tuning value associated with the highest SV C/N measurement, or highest SV C/N average for a plurality of SVs. In some aspects, Step 336 uses the selected tuning value to begin subsequent searches (as the value associated with bin #1).

In one aspect, the GPS is a proprietary CDMA Mobile Station Modem (MSM), although the invention is not limited to any particular type of GPS modem or manufacturer. Conventionally, the mobile station searches for the SVs using a two-step process. The MSM starts with the High Mode search and, if the requirements are not met (i.e., C/N>−33 dB), the mobile station attempts to perform Low Mode or Medium Mode searches. As used herein, a High Mode search is performed using a search time interval that is less (a shorter time duration) than the Medium Mode search time interval. Likewise, the Medium Mode search time interval is less than the Low Mode search time interval. During the High Mode search the MSM is capable of processing up to 8 SVs simultaneously with a per segment size of 32 chips. If the code phase search window size for specific SVs in the AA message is greater than 32 chips and less than 64 chips, then two searches (for the two segments) are needed for these particular SVs. If there are less than 8 SVs specified in the AA message, the two segments can both be searched in the same view. If the number of SVs specified by the AA message is 8 or less, and the code phase search window sizes of all SVs are less than 32, then all specified SVs can be searched with only one view in the High Mode search. As used herein, a "view" is understood to be a process of calculating SV Pseudorange information, C/N value, or the like, using searchers and correlators for a particular code phase search window of the SVs.

For example, if there are 8 SVs specified in the AA message, and assuming the first 7 SVs are specified at 30 chips while the last SV is specified with 46 chips, then a total of two views are needed. The first view processes all 8 SVs, but the last SV is processed with the first 32 chips of the 46 chips specified. The next view processes the last SV with the remainder of the 46 chips (i.e. 14 chips) with some overlapping chips from the first view. The results are normalized with respect to the number of chips processed. The MSM chooses one of the two views for the last SV based on several criteria (peak to normalized energy, distance between the two segments offset, C/N, etc). The total time spent during the High Mode search for one view is about 200 ms. This 200 ms time period includes 80 ms of integration time (i.e., peak finding). If the C/N ratio of at least 5 SVs is greater than 33 dB, then the Low Mode search is not needed. Otherwise the mobile station proceeds to the Low Mode search.

Prior to the start of the Low Mode search, the mobile station sends the Request GPS Sensitivity Assistance (SA) Message while in the CDMA mode. After receiving the Provide GPS Sensitivity Assistance Message, the mobile station switches back and forth between CDMA and GPS modes to perform multiple GPS views. Each time the mobile station tunes to GPS, it can tune away (from the CDMA network) for a maximum period of 2 seconds. The number of GPS views needed depends upon the number of SVs and the number of segments for each SV, which is determined by the code phase search window size. A single Low Mode search requires about 880 ms of processing time, plus overhead, which amounts to about 1200 ms in total.

If there isn't enough reserve to process a Low Mode search, a Medium Mode search is implemented. The Medium Mode search does not require the SA information from the PDE. The SA information provides the NAV bits used for the MSM time synchronization during a Low Mode search. If some of the SV searches in the High Mode results with good C/N values (i.e., greater than 33 dB), the Low Mode search will only need to process the remaining SVs in the AA message list. The results from both the High Mode and the Low Mode searches can be combined as part of the Provide Pseudorange Information message to the PDE.

Figure 4A:
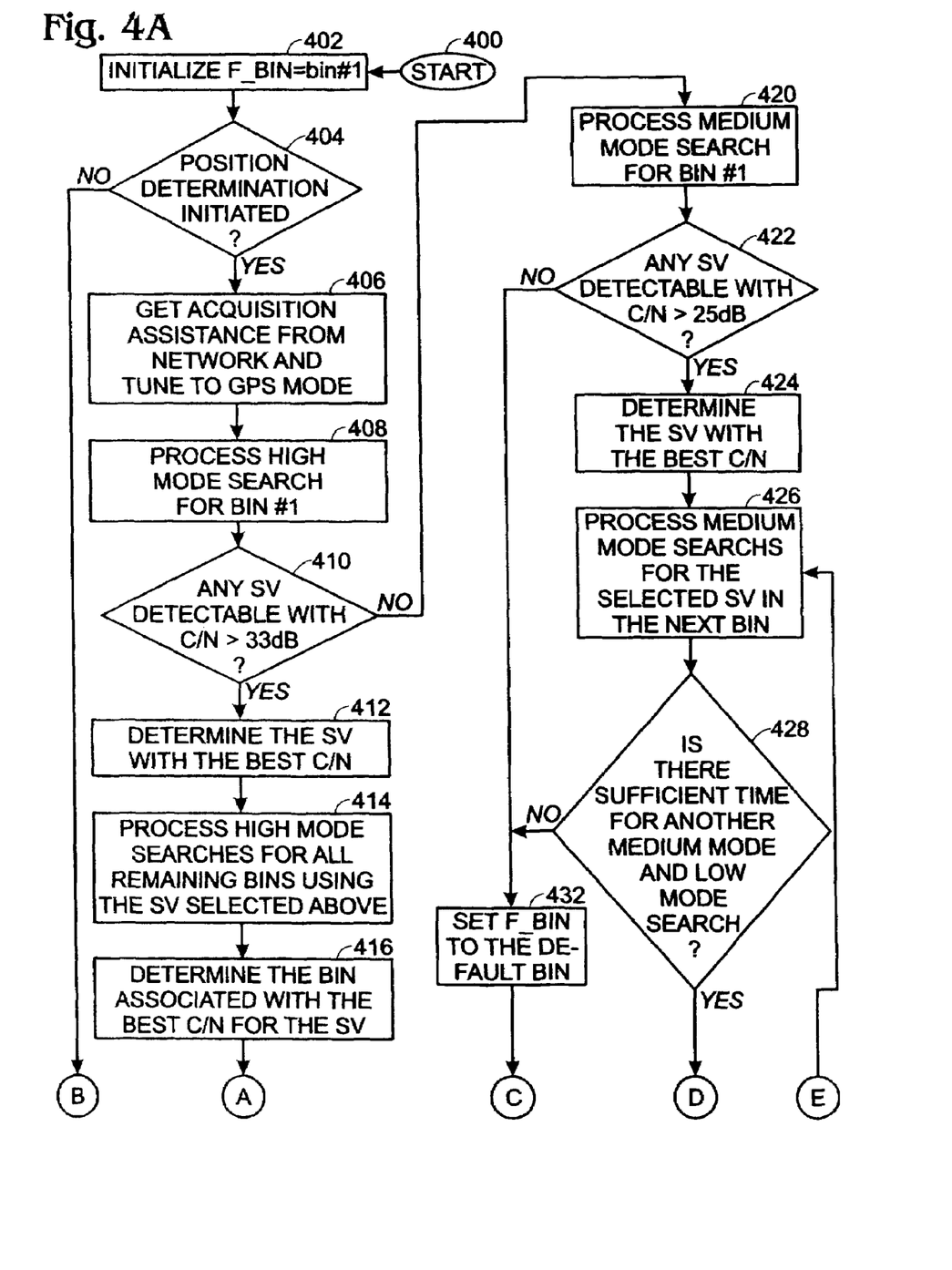
FIGS. 4A and 4B depict a detailed flowchart illustrating one aspect of the GPS antenna matching circuit tuning system that uses multiple search time intervals according to one embodiment of the invention.
Figure 4B:
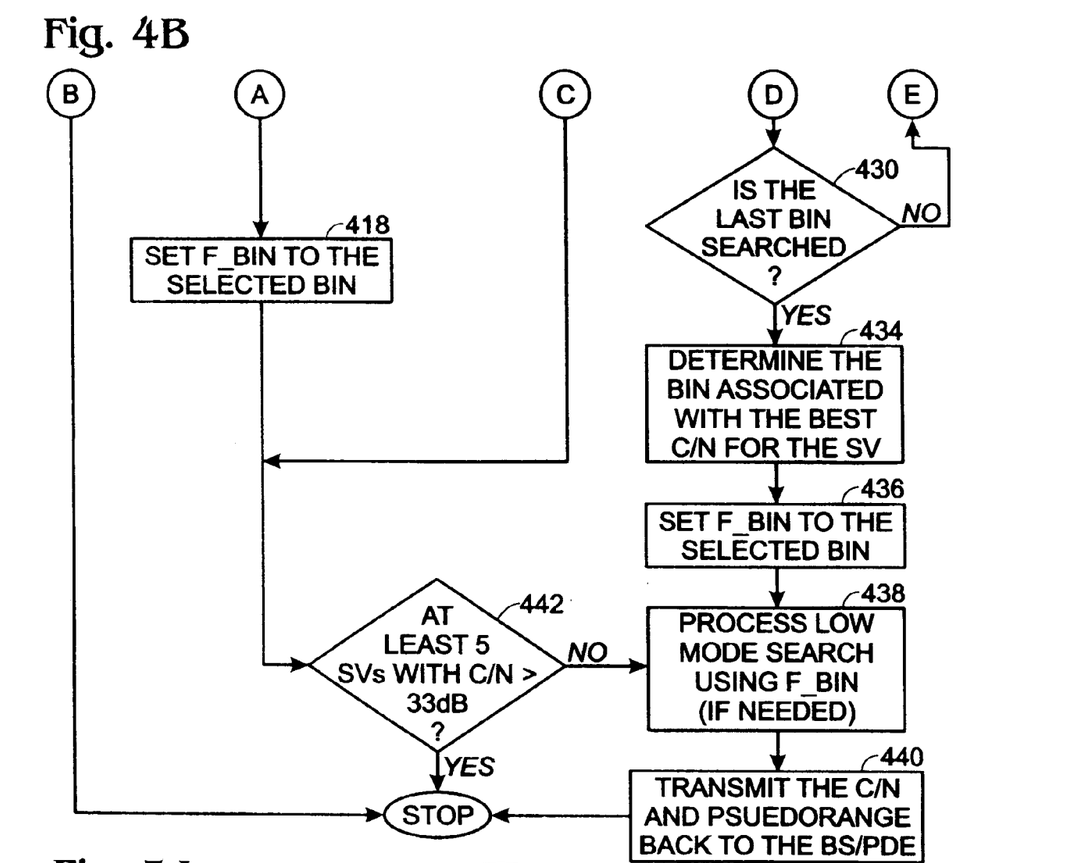

FIGS. 4A and 4B are a detailed flowchart illustrating one aspect of the GPS antenna matching circuit tuning system that uses multiple search time intervals. The present invention search method is able to process multiple views of the SVs specified in the M messages during High Mode searches. As described in the explanation of the conventional method above, the default processing of the High Mode consists of a single view of the SV, and the results (i.e., C/N and Pseudorange Information) are reported back to the PDE. In order to determine the optimal frequency search bins corresponding to different frequency tuning (or impedance matching tuning values) multiple views are required. Each view corresponds to a particular tuning of the matching network (associated with a particular frequency bin or tuning value). In one aspect of the present invention, N separate views, corresponding to N frequency bins, are needed.

As mentioned above, the matching network may employ a single FE capacitor, which can be tuned according to the desired frequency of operation. The input to the matching network is the voltage from the MSM. The number of voltages stored in the MSM can be the same as the number of frequency bins desired. Since the bandwidth of the GPS filter is approximately 30 MHz, and the GPS signal at free space of 1575 MHz can be detuned to about 1425 MHz, 5 frequency bins, corresponding to 5 voltage values, which is a practical number of values to store in the MSM.

Each time the mobile station processes a view, a different frequency bin, corresponding to a different voltage (tuning) value for the matching network, is selected. In the above example, 5 views are processed using 5 frequency bins. This represents processing the High Mode 5 times. Since it takes about 200 ms to process each view, 5 views correspond to a total of 1 second. Since it conventionally takes several seconds between the end of the first view in the High Mode and the start of the Low Mode, adding an extra High Mode search does not significantly impact the time needed to process a Low Mode search.

A more efficient method for implementing multiple High Mode searches is possible by tuning to the GPS mode continuously, for up to 5 High Mode searches. Conventionally, the searcher in the MSM is responsible for both GPS searches as well as CDMA pilot searches. Once the MC (Main Controller) in the MSM is tasked to start a GPS search, the MC loads the searcher into the DSP with GPS Demodulation parameters to enable GPS search. Once the search is completed (i.e., the search takes about 80 ms), the CDMA Demodulation parameters are loaded back into the DSP. The loading and unloading of GPS/CDMA parameters in the DSP takes up to 100 ms. By implementing the 5 High Mode searches in succession, without switching back from GPS to CDMA, the GPS Demodulation parameters need not be reloaded between High Mode searches. Overall, this efficient implementation of High Mode searches cuts down the High Mode search time from about 1.0 second to about 0.5 seconds.

As noted above, the MSM can process up to eight SVs (assuming one segment of up to 32 chips per segment). However, in cases where the code phase search window size for one or more of the SVs specified in the AA is greater than 32 chips (i.e., two segments for one SV), multiple GPS views may be needed. If less than 8 SVs are specified, but one SV has two search segments, it is still possible to complete all required searches in one view. In this case, two of the eight parallel MSM channels can process the two segments from the same SV in parallel to avoid multiple GPS views. To avoid processing multiple GPS views for all 5 High Mode searches, only the first High Mode search processes all SVs with all segments. The subsequent High Mode searches only process at most ONE GPS view, but contain segment(s) from the strongest SV. For completeness, the initial approach may require that an additional High Mode search (i.e., a 6th High Mode search) be processed for all SVs and all segments, once the optimum frequency bin is determined. This increases the chance that only High Mode searches are required, at the expense of an additional 160 ms of High Mode processing.

The algorithm starts from the initialization of a position determination session, Step 402. After receiving the Provide GPS Acquisition Assistance message from the PDE, the mobile station requests acquisition assistance from the PDE (Step 406). The mobile station proceeds to process the SVs listed in the AA message using frequency bin #1 (Step 408). Note: Frequency bin #1 is selected when the program outputs the corresponding tuning value (voltage) to the matching network.

As shown in FIG. 4, if any SVs have a C/N of greater than 33 dB (Step 410), then the "best" SV is selected in Step 412, and searches are conducted for that SV using the other bins (Step 414). In Step 416, the bin associated with the highest C/N is selected and used for subsequent low mode search in Step 438. If at least 5 of the SVs have a C/N of greater than 33 db (Step 442), then the findings can be reported to the PDE. If not, a low mode search in conducted using the selected bin (Step 438).

If a C/N of greater than 33 dB cannot be detected in Step 410, then a medium mode search is conducted in Step 420. If an SV with a C/N of greater than 25 dB cannot be detected (Step 422), the process goes to Step 432, where a default bin value is selected. Then, a low mode search is conducted in Step 438. If Step 422 does detect an SV with a C/N of greater than 25 dB, the SV with the best C/N is selected in Step 424, and searches are conducted for that SV using the other bins (Step 426/430), if sufficient time remains (Step 428). Then, a low mode search is conducted in Step 438 using the bin associated with the highest C/N determined in Step 434.

If the 5th strongest SV from the High Mode search is stronger than a C/N of 33 dB in Step 434, then the frequency bin selected in Step 416 is used for subsequent position determination sessions. Since the C/N of the SVs are high enough, a Low Mode search is not required. The algorithm proceeds to respond to the BS/PDE with the C/N and Pseudorange information associated with the SVs.

In some aspects, if the C/N of the strongest SV is calculated in the current frequency bin, the algorithm continues to the next frequency bin. However, if the C/N value of the current frequency bin is lower than that of the previous frequency bin, then further searches on the other frequency bins are not needed. The previous frequency bin is selected as the preferred bin for Low Mode processing.

As a refinement to the algorithm, if the second frequency bin search results in the same C/N as the previous frequency bin, the frequency bin with the largest number of detected SVs is selected as the preferred frequency bin to use for a subsequent low mode search. Due to the possible changes in the surrounding environment and many possible hand positions on the phone while the GPS mode is active, it is beneficial to sort out the best C/N for all detected SVs, from all the frequency bin searches. For example, if frequency bin #1 results in an SV#1 measurement of C/N=34 dB and an SV#2 C/N=38 dB, while frequency bin #2 results in an SV#1 measurement of C/N=36 dB and an SV#2 of C/N=37 dB (assuming the other SV measurements for the two frequency bins are the same), then the reported SV C/N values should include SV#1 with C/N=36 dB from frequency bin #2 and SV#2 with C/N=38 dB from frequency bin #1. This method increases the likelihood that the multiple High Mode searches detect enough SVs with strong enough peaks to bypass the need for the Low Mode search.

It is assumed in this algorithm that the detuning of the GPS antenna does not create instances of a local minimum in the return loss curve. Once the C/N decreases from one frequency bin to another, further increases in C/N should not be possible. However in other aspects, it is possible that all the frequency bins are searched, regardless of whether the C/N increases or decreases from the previous value.

In the conventional MSM implementation, the High Mode search only reports C/N values for SVs greater than a C/N of 33 dB. However, in typical indoor environment, it is difficult to find SVs with a C/N greater than −27 dB. Therefore, High Mode searches cannot be used for frequency bin selection. The conventional algorithm proceeds to process Medium Mode searches (i.e., Deep Medium Mode searches). Medium Mode searches are very similar to High Mode searches, with the difference being the length of time it takes to process a search and the strengths of SV detectable by the search mode. For Medium Mode searches, SVs can be detected with a C/N as low as 25 dB. However, it takes 880 ms to process one Medium Mode search, as opposed to the 200 ms required to process one High Mode search.

After every Medium Mode search, the algorithm determines the time remaining prior to the 16-second expiration (time between fix). The algorithm compares the time needed for a Low Mode search to the time remaining. This guarantees a Low Mode search can still be performed if needed. If time remaining is sufficient, additional Medium Mode searches may be processed on up to the maximum number of frequency bins supported. If no SV is detectable under the Medium Mode search, the default frequency bin is used for the Low Mode search. The default frequency bin is created in a prior position determination session where strong SV signals were measured (i.e., outdoors). The default frequency bin may be updated as needed. The default frequency bin may also be used if not all frequency bins were searched in the Medium Mode. Alternatively, the algorithm may choose to use the frequency bin associated with the highest C/N detected. This may depend on the number of frequency bins searched prior to the expiration of time. Alternatively, the algorithm may choose to use the frequency bin associated with the highest C/N detected. This may depend on the number of frequency bins searched prior to time expiration. For example, if there are 5 frequency bins and 4 frequency bins have already been searched, but the time has expired before processing the 5th frequency bin, an implementation can select the best bin out of the 4 frequency bins, based on the highest C/N, as opposed to using the default frequency bin. It may be assumed that a user holds the mobile station in a similar fashion for each call.

The subsequent Low Mode search is processed using the most desirable frequency bin, corresponding to the optimum matching network configuration. Although the algorithm uses multiple High Mode or Medium Mode searches that may increase delay for the MS's response back to the PDE, multiple searches using different frequency bins or matching network configurations also increase the likelihood that the Low Mode search may be bypassed entirely. This likelihood is due to the increase in C/N resulting from the use of the optimum frequency bin during High Mode or Medium Mode searches. For the case of a MS with the capability of simultaneous processing GPS and CDMA signals, the increased delay from tuning out of CDMA during a call is not an issue.

Figure 5A:
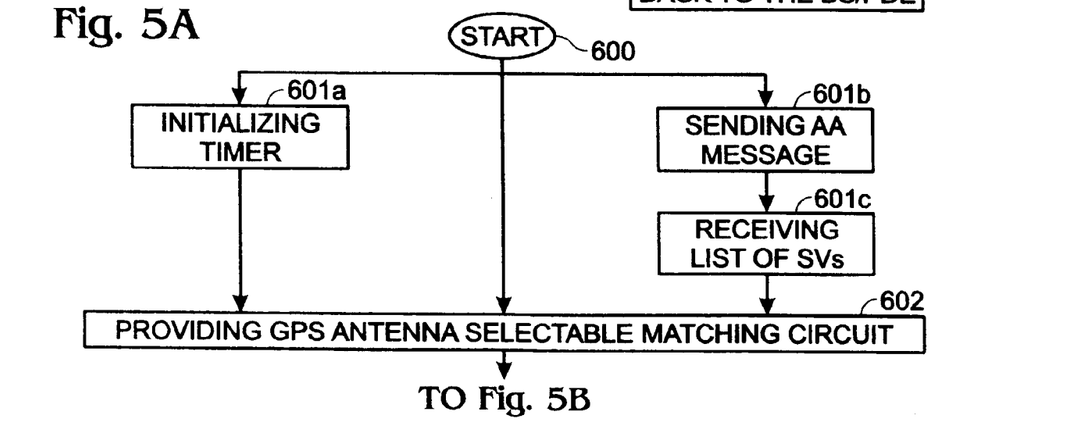
FIGS. 5A and 5B depict a simple flowchart illustrating a method for tuning a GPS antenna matching circuit in a portable wireless communications device according to one embodiment of the invention.
Figure 5B:
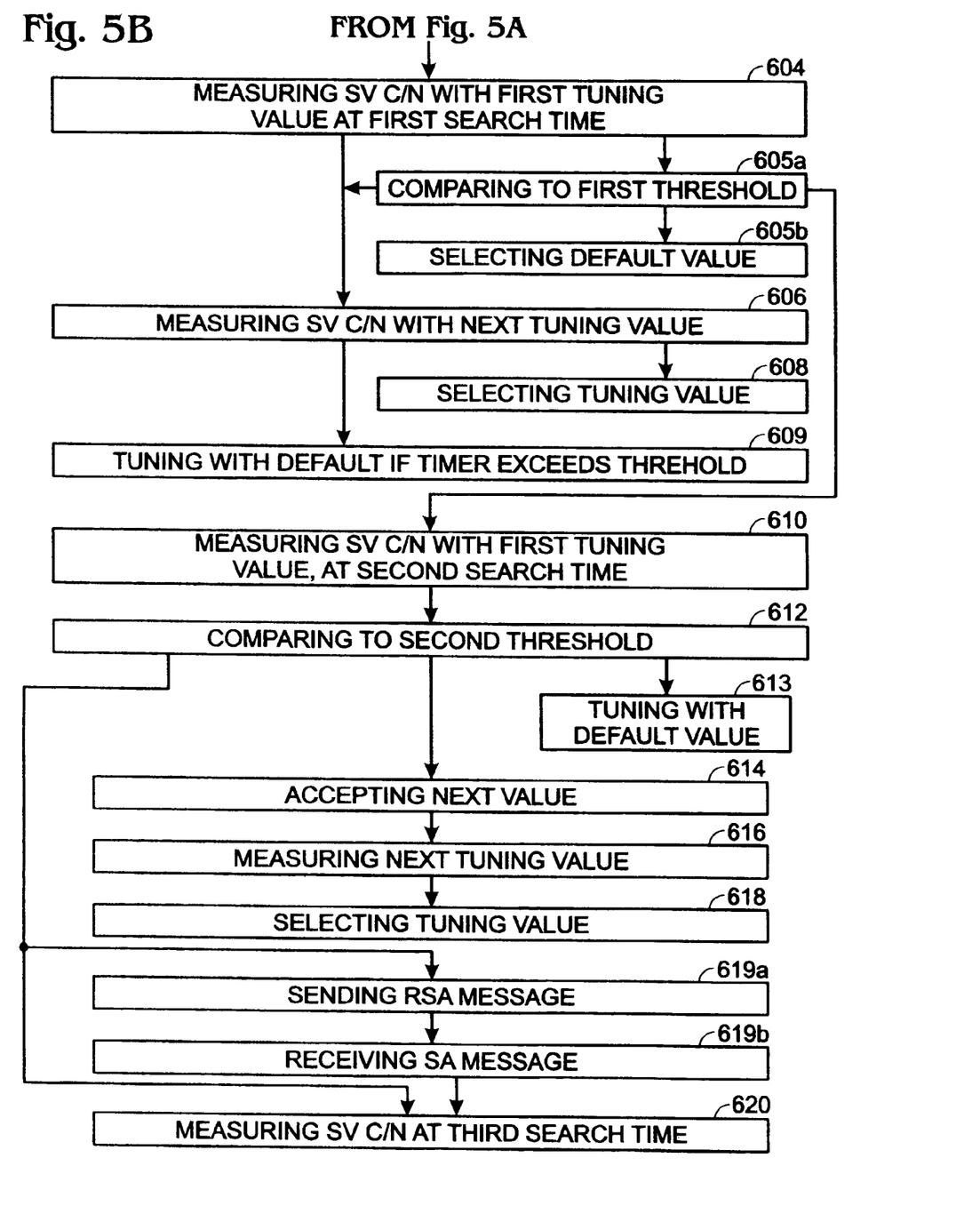

FIGS. 5A and 5B are a simple flowchart illustrating a method for tuning a GPS antenna matching circuit in a portable wireless communications device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 provides a GPS antenna with a selectively tunable matching circuit. Step 604 accepts a first matching circuit tuning value. Step 604 measures SV C/N associated with the first tuning value and a first search time interval. Step 606 measures the SV C/N associated with a next tuning value and the first search time interval. Step 608 selects the tuning value associated with the highest SV C/N to tune the matching circuit. As noted above, measurements of quality, other than C/N, may also be used.

In one aspect, Step 605a compares the first tuning value SV C/N to a first minimum threshold. Then, Step 606 measures the SV C/N associated with next tuning value in response to the first tuning value SV C/N exceeding the first minimum threshold. In another aspect, Step 605b selects a default tuning value to tune the matching circuit, in response to the first tuning value SV C/N failing to meet the first minimum threshold.

In a different aspect, Step 605a compares a SV with the highest measured C/N, designated as a first SV, to the first minimum threshold. Then, Step 606 measures the first SV C/N using the next tuning value and the first search time interval, and Step 608 selects the tuning value associated with the highest measured first SV C/N. As noted above, the "first" SV may also be read to represent a group of SVs.

However, many other algorithms can be used for comparing the frequency bins or tuning values. In another aspect, Step 606 measures a SV C/N, higher than the first SV C/N and designated as a second SV, using the next tuning value and the first search time interval. Then, Step 608 selects the next tuning value, associated with the second SV C/N, to tune the matching circuit. As noted above, other algorithms exists for making selections based upon a group of SVs (i.e., the best four SVs). The above-described method is not limited to any particular selection criteria.

In one aspect, Step 601a initializes a timer prior to measuring SV C/N at the first search time interval using the first tuning value (Step 602). Step 609 tunes the matching circuit with a default tuning value if the timer exceeds a time threshold.

In another aspect, Step 610 measures the first SV C/N using the first tuning value and a second search time interval, longer than the first time interval, if the first SV C/N does not exceed the first minimum threshold (Step 605a). Step 612 compares the first SV C/N to a second minimum threshold in response to measuring the first SV C/N at the second search time interval. Typically, the second minimum threshold is lower (closer to the noise floor) than the first minimum threshold. Step 614 accepts a next tuning value if the first SV C/N exceeds the second minimum threshold. Then, Step 616 measures the first SV C/N at the second search time interval, using the next tuning value. Step 618 selects the tuning value associated with the highest first SV C/N, measured at the second search time interval, to tune the matching circuit.

In one aspect, Step 613 tunes the matching circuit with a default tuning value if the first SV C/N does not exceed the second minimum threshold (Step 612). Alternatively, Step 620 measures the first SV C/N at a third search time interval, longer than the second search time interval if the first SV C/N, measured at the second search time interval and the first tuning value, does not exceed the second minimum threshold.

In another aspect, where the portable wireless device is a CDMA telephone, Step 619a sends a Request GPS Sensitivity Assistance (SA) message to a communicating base station (BS) prior to measuring the first SV C/N at the third search time interval (Step 620), and Step 619b receives a Provide GPS Sensitivity Assistance (SA) message. Alternatively but not shown, the Request GPS Sensitivity Assistance message can be sent, and the Provide GPS Sensitivity Assistance message received at other times in the process (i.e., before the first search interval searching (Step 602), or before the second interval searching (Step 610).

In a different aspect, where once again the portable wireless device is a CDMA telephone, Step 601b sends a Request GPS Acquisition Assistance message to a communicating BS, prior to measuring SV C/N using the first tuning value and the first search time interval in Step 602. Then, Step 601c receives a Provide GPS Acquisition Assistance message, with a list of accessible SVs, from the BS. In other aspects, the wireless device is a GSM or UMTS device. These networks typically use similar messaging to communicate SV information.

A system and method for tuning a GPS antenna matching circuit have been provided. Examples of specific SV selection criteria, quality criteria, power levels, and search intervals have been provided to illustrate the invention. However, the invention is not limited to merely these examples. Other variations and embodiments of the invention will occur to those skilled in the art having the benefit of this disclosure.

What is claimed is:

1. In a portable wireless communications device including a Global Positioning System (GPS) antenna with a selectively tunable matching circuit, a method for tuning the matching circuit, the method comprising:

accepting a first matching circuit tuning value;

measuring satellite vehicle (SV) carrier-to-noise ratio (C/N) associated with the first tuning value and a first search time interval;

measuring the SV C/N associated with a next tuning value and the first search time interval; and selecting the tuning value associated with the highest SV C/N to tune the matching circuit.

2. The method of claim 1 further comprising:

comparing the first tuning value SV C/N to a first minimum threshold;

wherein the measuring the SV C/N associated with the next tuning value includes measuring the SV C/N associated with the next tuning value in response to the first tuning value SV C/N exceeding the first minimum threshold.

3. The method of claim 2 further comprising:
in response to the first tuning value SV C/N failing to meet the first minimum threshold, selecting a default tuning value to tune the matching circuit.

4. The method of claim 2 wherein the comparing the SV C/N to the first minimum threshold includes comparing a SV with the highest measured C/N, designated as a first SV, to the first minimum threshold;
wherein the measuring the SV C/N associated with the next tuning value includes measuring the first SV C/N using the next tuning value and the first search time interval; and
wherein the selecting the tuning value associated with the highest SV C/N to tune the matching circuit includes selecting the tuning value associated with the highest measured first SV C/N.

5. The method of claim 4 wherein the measuring SV C/N associated with the next tuning value includes measuring a SV C/N, higher than the first SV C/N and designated as a second SV, using the next tuning value and the first search time interval; and
wherein the selecting the tuning value associated with the highest SV C/N to tune the matching circuit includes selecting the next tuning value, associated with the second SV C/N, to tune the matching circuit.

6. The method of claim 4 further comprising:
in response to the first SV C/N not exceeding the first minimum threshold, measuring the first SV C/N using the first tuning value and a second search time interval, longer than the first time interval.

7. The method of claim 6 further comprising:
in response to measuring the first SV C/N at the second search time interval, comparing the first SV C/N to a second minimum threshold;
in response to the first SV C/N exceeding the second minimum threshold, accepting a next tuning value; and
measuring the first SV C/N at the second search time interval, using the next tuning value.

8. The method of claim 7 wherein the comparing the first SV C/N to the second minimum threshold includes the second minimum threshold being lower than the first minimum threshold.

9. The method of claim 8 further comprising:
in response to the first SV C/N not exceeding the second minimum threshold, tuning the matching circuit with a default tuning value.

10. The method of claim 8 further comprising:
prior to the measuring SV C/N at the first search time interval using the first tuning value, initializing a timer; and
in response to the timer exceeding a time threshold, tuning the matching circuit with a default tuning value.

11. The method of claim 10 further comprising selecting the tuning value associated with the highest first SV C/N, measured at the second search time interval, to tune the matching circuit.

12. The method of claim 10 further comprising:
in response to the first SV C/N, measured at the second search time interval and the first tuning value, not exceeding the second minimum threshold, measuring the first SV C/N at a third search time interval, longer than the second search time interval.

13. The method of claim 12 wherein the portable wireless device is a Code Division Multiple Access (CDMA) telephone, the method further comprising:
prior to the measuring the first SV C/N at the third search time interval, sending a Request GPS Sensitivity Assistance message to a communicating base station (BS); and
receiving a Provide GPS Sensitivity Assistance message.

14. The method of claim 1 wherein the portable wireless device is a CDMA telephone, the method further comprising:
sending a Request GPS Sensitivity Assistance message to a communicating BS; and
receiving a Provide GPS Sensitivity Assistance message.

15. The method of claim 1 wherein the portable wireless device is a CDMA telephone, the method further comprising:
prior to the measuring SV C/N using the first tuning value and the first search time interval, sending a Request GPS Assistance Acquisition message to a communicating BS; and
receiving a Provide GPS Sensitivity Assistance message, with a list of accessible SVs, from the BS.

16. In a portable wireless communications device, a system for tuning a Global Positioning System (GPS) antenna matching circuit, the system comprising:
an antenna for receiving radiated Satellite Vehicle (SV) signals, with an interface for supplying conducted SV signals;
a GPS modem having an input to accept the SV signals, the GPS modem measuring SV carrier-to-noise ratio (C/N) and supplying a tuning value signal at an output;
a tunable matching circuit having a first input connected to the antenna interface, a second input to receive the tuning value signal, and an output connected to the GPS modem input, the matching circuit selectively tuning the impedance of its input to the antenna interface in response to the tuning value signal; and
wherein the GPS modem supplies a first tuning value, measures the SV C/N associated with the first tuning value and a first search time interval, supplies a next tuning value, measures the SV C/N associated with the next tuning value and the first search time interval, and selects the tuning value associated with the highest SV C/N to tune the matching circuit.

17. The system of claim 16 wherein the GPS modem supplies the next tuning value in response to the SV C/N associated with the first tuning value exceeding a first minimum threshold.

18. The system of claim 17 wherein the GPS modem compares a SV with the highest measured C/N and designated as a first SV, to the first minimum threshold, measures the first SV C/N using the next tuning value and the first search time interval, and selects the tuning value associated with the highest measured first SV C/N, to tune the matching circuit.

19. The system of claim 18 wherein the GPS modem measures the first SV C/N using the first tuning value and a second search time interval, longer than the first time interval, in response to the first SV C/N not exceeding the first minimum threshold.

20. The system of claim 19 wherein the GPS modem, in response to measuring the first SV C/N at the second search time interval, compares the first SV C/N to a second minimum threshold, lower than the first minimum threshold, accepts a next tuning value in response to the first SV C/N exceeding the second minimum threshold, and measures the first SV C/N at the second search time interval, using the next tuning value.

21. The system of claim 20 wherein the GPS modem selects the tuning value associated with the highest first SV C/N, measured at the second search time interval, to tune the matching circuit.

22. The system of claim 20 wherein the GPS modem measures the first SV C/N at a third search time interval, longer than the second search time interval, in response to the first SV C/N, measured at the second search time interval and the first tuning value, not exceeding the second minimum threshold.

23. The system of claim 22 further comprising:
a Code Division Multiple Access (CDMA) cellular transceiver having a wireless interface to send a Request GPS Sensitivity Assistance message to a communicating base station (BS) and an output to supply a received Provide GPS Sensitivity Assistance (SA) message; and
wherein the GPS modem has an input to receive the Provide GPS SA message from the cellular transceiver prior to measuring the first SV C/N at the third search time interval.

24. The system of claim 16 further comprising:
a Code Division Multiple Access (CDMA) cellular transceiver having a wireless interface to send a Request GPS Sensitivity Assistance message to a communicating base station (BS) and an output to supply a received Provide GPS Sensitivity Assistance (SA) message; and
wherein the GPS modem has an input to receive the Provide GPS SA message from the cellular transceiver.

25. In a Code Division Multiple Access (CDMA), a system for tuning a Global Positioning System (GPS) antenna matching circuit, the system comprising:
a CDMA cellular transceiver having a wireless interface to send a Request GPS Assistance Acquisition message to a communicating base station (BS) and an output to supply a received list of available SVs;
a GPS antenna for receiving radiated Satellite Vehicle (SV) signals, with an interface for supplying conducted SV signals;
a GPS modem having an input to accept the SV signals, the GPS modem measuring SV carrier-to-noise ratio (C/N) and supplying a tuning value signal at an output;
a tunable matching circuit having a first input connected to the antenna interface, a second input to receive the tuning value signal, and an output connected to the GPS modem input, the matching circuit selectively tuning the impedance of its input to the antenna interface in response to the tuning value signal; and
wherein the GPS modem has an input to receive the list of available SVs from the cellular transceiver prior to measuring SV C/N using the first tuning value and the first search time interval, wherein the GPS modem supplies a first tuning value, measures the SV C/N associated with the first tuning value and a first search time interval, supplies a next tuning value, measures the SV C/N associated with the next tuning value and the first search time interval, and selects the tuning value associated with the highest SV C/N to tune the matching circuit.

26. In a portable wireless communications device including a Global Positioning System (GPS) antenna with a selectively tunable matching circuit, a method for tuning the matching circuit, the method comprising:
accepting a first matching circuit tuning value;
measuring satellite vehicle (SV) carrier-to-noise ratio (C/N) associated with the first tuning value in a first time interval segment;
if the SV C/N exceeds a minimum threshold, selecting the first tuning value to tune the matching circuit;
if the SV C/N does not exceed the minimum threshold, accepting a second tuning value;
measuring SV C/N associated with the second tuning value in a second time interval segment; and
if the SV C/N exceeds a minimum threshold, selecting the second tuning value to tune the matching circuit.

27. The method of claim 26 wherein measuring SV C/N associated with the first tuning value in the first time interval segment includes measuring SV C/N for a plurality of SVs in the first time interval segment; and
wherein selecting the first tuning value to tune the matching circuit if the SV C/N exceeds a minimum threshold includes selecting the first tuning value if a first plurality of SVs each have a C/N that exceeds the minimum threshold.

28. The method of claim 26 further comprising:
iteratively measuring SV C/N for a subsequent matching circuit tuning value, from a plurality of tuning values, if the SV C/N for a previous tuning value fails to exceed the minimum threshold.

29. The method of claim 28 further comprising:
in response to failing to measure a SV C/N greater than the minimum threshold, for each of the plurality of tuning values, selecting the tuning value associated with the highest measured SV C/N.

* * * * *